(12) United States Patent
Masuda et al.

(10) Patent No.: US 8,314,160 B2
(45) Date of Patent: Nov. 20, 2012

(54) THERMOPLASTIC RESIN FOAM

(75) Inventors: Kohji Masuda, Chiyoda-ku (JP);
Masayasu Ito, Chiyoda-ku (JP); Kojiro Inamori, Chiyoda-ku (JP); Naoki Yoshida, Chiyoda-ku (JP); Michiaki Kawakami, Chiyoda-ku (JP); Hiroyuki Yamazaki, Chiyoda-ku (JP); Hidehumi Miyagi, Chiyoda-ku (JP); Yong Hoon Kim, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 365 days.

(21) Appl. No.: 11/571,662

(22) PCT Filed: Dec. 13, 2005

(86) PCT No.: PCT/JP2005/022858
§ 371 (c)(1),
(2), (4) Date: Jan. 5, 2007

(87) PCT Pub. No.: WO2006/068009
PCT Pub. Date: Jun. 29, 2006

(65) Prior Publication Data
US 2008/0300334 A1    Dec. 4, 2008

(30) Foreign Application Priority Data
Dec. 24, 2004    (JP) .................... 2004-373270

(51) Int. Cl.
*C08L 67/00*    (2006.01)
*C08L 77/00*    (2006.01)
*C08G 63/00*    (2006.01)

(52) U.S. Cl. ........................ 521/138; 525/444

(58) Field of Classification Search .............. 521/50, 521/138; 525/444
See application file for complete search history.

(56) References Cited

U.S. PATENT DOCUMENTS

| 4,554,293 | A | * | 11/1985 | Park ................................. 521/81 |
| 5,000,991 | A | * | 3/1991 | Hayashi et al. .............. 428/36.5 |
| 5,137,933 | A | * | 8/1992 | Hiromoto et al. ............. 521/139 |
| 5,723,510 | A | * | 3/1998 | Kabumoto et al. ........... 521/182 |
| 5,801,206 | A | * | 9/1998 | Khemani et al. ................ 521/81 |
| 5,997,781 | A | * | 12/1999 | Nishikawa et al. .......... 264/45.1 |

(Continued)

FOREIGN PATENT DOCUMENTS

JP    6-55651    3/1994

(Continued)

OTHER PUBLICATIONS

Machine translation of JP 11-049883 A, 2009.*

(Continued)

*Primary Examiner* — Liam Heincer
(74) *Attorney, Agent, or Firm* — Oblon, Spivak, McClelland, Maier & Neustadt, L.L.P.

(57) ABSTRACT

A thermoplastic resin foam which has both high reflectance and superior shape-retention properties, suitable for use in backlights and illumination boxes for illumination signboards, lighting fixtures, displays and the like. The thermoplastic resin foam is manufactured by a manufacturing method including a procedure for holding a resin sheet composed of thermoplastic resin (A) and thermoplastic resin (B), which has a functional group having an affinity with thermoplastic resin (A), within a pressurized inert gas atmosphere to enable the resin sheet to contain inert gas, and a procedure for foaming by heating the resin sheet containing inert gas at a temperature higher than the softening temperature of thermoplastic resin, under normal pressure.

17 Claims, 1 Drawing Sheet

U.S. PATENT DOCUMENTS

| | | | |
|---|---|---|---|
| 6,812,264 B2 * | 11/2004 | Sunagawa et al. | 521/138 |
| 6,841,106 B1 * | 1/2005 | Fujimaki et al. | 264/50 |
| 2001/0041772 A1 * | 11/2001 | Masubuchi et al. | 525/107 |
| 2003/0119928 A1 * | 6/2003 | Tokiwa et al. | 521/82 |
| 2004/0229966 A1 * | 11/2004 | Dontula et al. | 521/50 |
| 2004/0241418 A1 * | 12/2004 | Cahill | 428/317.9 |
| 2006/0084740 A1 * | 4/2006 | Kao et al. | 524/414 |
| 2007/0129454 A1 * | 6/2007 | Su et al. | 521/142 |
| 2007/0232747 A1 * | 10/2007 | Maris et al. | 524/505 |
| 2008/0227905 A1 * | 9/2008 | Kumasaki et al. | 524/505 |
| 2009/0043002 A1 * | 2/2009 | Masuda et al. | 521/123 |

FOREIGN PATENT DOCUMENTS

| | | | |
|---|---|---|---|
| JP | 6-57026 | | 3/1994 |
| JP | 06344457 A | * | 12/1994 |
| JP | 11049883 A | * | 2/1999 |
| JP | 11-170285 | | 6/1999 |
| JP | 2000-169615 | | 6/2000 |
| JP | 2000-248101 | | 9/2000 |
| JP | 2002-300690 | | 10/2002 |
| WO | WO-2004016678 | * | 2/2004 |

OTHER PUBLICATIONS

Machine translation of JP 06-344457 A, 2009.*

Heino et al., Journal of Applied Polymer Science, 65, 241-249, 1998.*

Carbonyl group, Hawley's Condensed Chemical Dictionary, 14th Edition, 2002 by John Wiley & Sons, Inc.*

U.S. Appl. No. 10/576,143, filed Apr. 18, 2006, Masuda, et al.

* cited by examiner

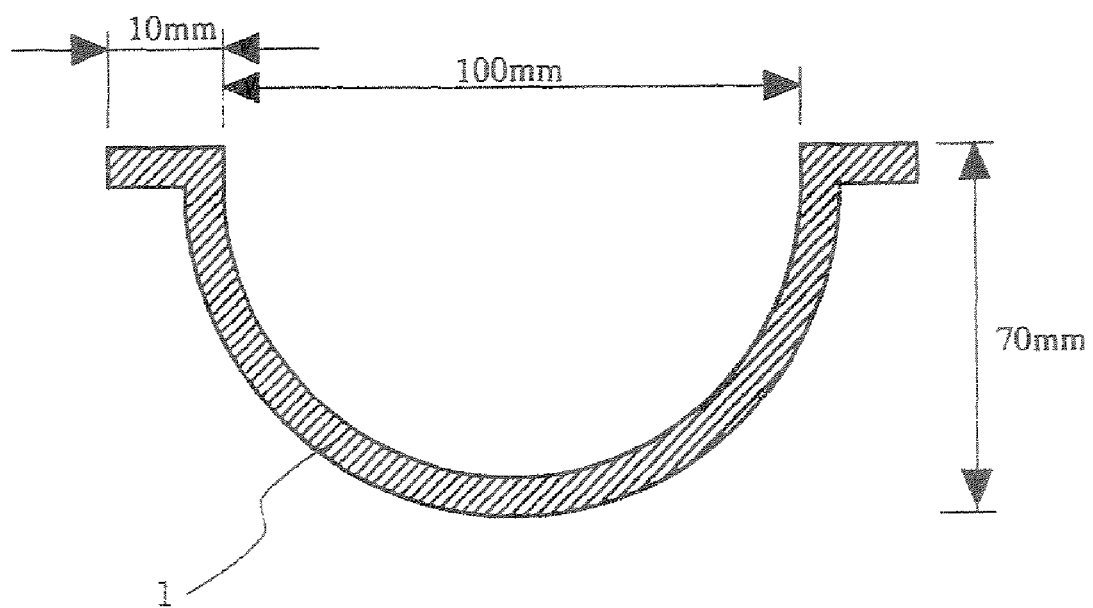

THERMOPLASTIC RESIN FOAM

TECHNICAL FIELD

The present invention relates to thermoplastic resin foam. More particularly, the present invention relates to thermoplastic resin foam having fine pores with mean bubble diameter of 10 μm or less therewithin. The thermoplastic resin foam obtained by the present invention has high optical reflectance, and thus, can be implemented effectively in backlights and illumination boxes for illumination signboards, lighting fixtures, displays and the like.

BACKGROUND ART

Conventionally proposed light reflector plates for use in backlights for illumination signboards, lighting fixtures, displays and the like, include those fabricated such that a light-reflecting synthetic resin film or sheet is formed into a three-dimensional shape to thereby yield a light reflector plate (refer to, for example, Patent Reference 1).

Known light-reflecting synthetic resin films and sheets include thermoplastic resin film or sheet having numerous fine bubbles or pores therewithin (for example, refer to Patent Reference 2), and thermoplastic resin film containing fillers wherein numerous voids are formed with the filler as the core (for example, refer to Patent Reference 3).

The former thermoplastic resin film or sheet having numerous fine bubbles or pores is obtained by placing molten or solid thermoplastic resin in contact with inert gas under increasing pressure then depressurizing, and subsequently foaming the resin by heating the resin at a temperature higher than the softening temperature thereof under normal pressure. The obtained thermoplastic resin foam film or sheet has high reflectance due to a fine mean bubble diameter of 50 μm or less, as well as superior shape-retention properties because the thickness thereof can be 200 μm or more, and therefore, the thermoplastic resin foam film or sheet can be singly processed into a three-dimensional shape. The light reflectance of the thermoplastic resin foam film or sheet generally tends to indicate higher values as the number of bubbles per unit volume increases. Therefore, high light reflectance can be achieved because the smaller the bubble diameters are, the more the number of bubbles per unit volume of the resin is. Because thinner film or sheet can be obtained as a result, thermoplastic resin foam having numerous finer bubbles or pores is desired.

On the other hand, the latter thermoplastic resin film containing fillers can be obtained by forming an un-stretched film containing fillers such as calcium carbonate or barium sulfate and forming numerous voids with the fillers as the core by stretching this un-stretched film. However, because stretch processing is performed, the thickness of the obtained film becomes thin, under 200 μm and thus, the film alone does not have shape-retention properties and light leaking to the back surface of the film increases. Therefore, this film is implemented by placing a plate having sufficient strength and light-shielding properties to the back surface thereof.

Known thermoplastic polyester resin includes thermoplastic polyester resin loam formed by mixing an elastomer therewithin (for example, refer to Patent Reference 4). However, it is merely stated that impact-resistance is enhanced by mixing an elastomer with polyester, and there are no statements or implications regarding the bubble diameters of the obtained foam. It is difficult to make the bubbles fine and to disperse the bubbles evenly with the extrusion foaming method described in Patent Reference 4, and in reality sheet formed by mixing an elastomer with polyester and performing extrusion foaming has large bubble diameters. Ever when a reflecting plate is formed from this extrusion foamed sheet the reflecting plate does not have sufficient functions as a reflecting plate because the reflectance is low.

[Patent Reference 1] Japanese Patent Laid-Open Publication 2002-122863
[Patent Reference 2] WO Publication 97/01117
[Patent Reference 3] Japanese Patent Laid-Open Publication Heisei 4-296819
[Patent Reference 4] Japanese Patent Laid-Open Publication Heisei 11-49883

DISCLOSURE OF THE INVENTION

Problems to be Resolved by the Invention

In recent years there has been a call for reduction in power consumption, and resin films or sheets having higher reflectance are required. Furthermore, the need for space-saving is rising, particularly in the fields of illumination signboards and displays, and thinner light-reflecting resin films or sheets are required. In addition, ultraviolet rays which promote the degradation of resin are emitted from the light source of the illumination signboards and displays, and therefore, processing for preventing de gradation is strongly desired. An object of the present invention is to provide thermoplastic resin foam which not only has both high reflectance and shape-retention properties but also has high ultraviolet inhibiting abilities.

Means of Solving the Problems

As a result of thorough studies in order to resolve the foregoing issues, the present inventors found that thermoplastic resin foam having fine pores with a pore diameter of 10 μm or less therewithin can be obtained by foaming the resin after adding a certain thermoplastic resin to the thermoplastic resin. In addition, even if the thermoplastic resin is originally prone to ultraviolet degradation this resin can be given high ultraviolet inhibiting abilities by adding a layer containing an ultraviolet inhibitor on at least one surface thereof.

In other words, in the present invention, it was discovered that, by adding thermoplastic resin (B), to which a functional group having a some kind of a mutual interaction (affinities such as polarization, hydrogen-bonding, or reaction) with the thermoplastic resin (A) has been added, to the thermoplastic resin (A), the thermoplastic resin (B) is finely dispersed throughout the thermoplastic resin (A), thus having a significant effect on the miniaturization of bubbles by becoming the starting points for crystal-nucleation, the starting points for bubble-nucleation and the like.

In other words, the present invention provides:

(1) a thermoplastic resin foam which is a resin sheet composed of thermoplastic resin (A) and thermoplastic resin (B), wherein said thermoplastic 25 resin (B) has a functional group having an affinity with thermoplastic resin (A), and said thermoplastic resin foam having a plurality of pores with a mean bubble diameter of 10 μm or less therewithin;

(2) the thermoplastic resin foam according to (1), wherein said thermoplastic resin (B) is a thermoplastic elastomer having said functional group;

(3) the thermoplastic resin foam according to (2), wherein said thermoplastic resin (B) is a polystyrene elastomer having said functional group;

(4) the thermoplastic resin foam according to anyone of (1) to (3), wherein said thermoplastic resin (A) is a polyester resin;

(5) the thermoplastic resin foam according to anyone of (1) to (4), wherein specific gravity is 0.7 or less;

(6) the thermoplastic resin foam according to anyone of (1) to (5), 10 wherein 0.1 to 10 parts by weight of thermoplastic resin (B) which has said functional group having an affinity with thermoplastic resin (A) is added to 100 parts by weight of said thermoplastic resin (A);

(7) the thermoplastic resin foam according to anyone of (1) to (6), which is manufactured by a manufacturing method comprising a procedure for holding a resin sheet composed of thermoplastic resin (A) and thermoplastic resin (B), which has a functional group having an affinity with thermoplastic resin (A), within a pressurized inert gas atmosphere to enable the resin sheet to contain inert gas, and a procedure for foaming by heating the resin sheet containing inert gas under normal pressure;

(8) the thermoplastic resin foam according to anyone of (1) to (7) to which a layer including ultraviolet inhibitor is added to at least one surface thereof.

Effect of the Invention

Because the thermoplastic resin foam obtained by the present invention is fine, with a mean bubble diameter of 10 μm or less, light reflectance is high, the sheet can be made thinner, and therefore, the thermoplastic resin foam can be used effectively as a light reflector plate.

BRIEF DESCRIPTION OF THE DRAWINGS

FIG. 1 is a cross-sectional view of a light reflector created in an embodiment of the present invention.

BEST MODE FOR CARRYING OUT THE INVENTION

The thermoplastic resin (A) implemented in the present invention is not particularly limited and can be polyester, polycarbonate, polyamide, polyolefin polystyrene, acrylic resin, or the like. In addition, polyester can be selected from polyethylene terephthalate, polybutylene terephthalate, polytrimethylene terephthalate, or polyethylene naphtahalate, accordingly, and can be implemented singly or in a combination of two types or more. Among these, polyester resin is preferable, and polyethylene terephthalate is particularly favorable from the perspective of foaming and heat-resistance.

The function group in thermoplastic resin (B) can be, for example, an amino group, a glycidyl group, a carboxyl group (including acid anhydride and metallic salt), a hydroxyl group, a aldehyde group, a carbonyl group, a sulfo group, a nitro group, a halogen group, an oxazoline group, an isocyanate group, or a thiol group. Among these, if thermoplastic resin (A) is polyester, the amino group, glycidyl group, and carboxyl group are preferable because the reactions thereof to polyester are favorable.

The thermoplastic resin (B) having the foregoing functional group which reacts to thermoplastic resin (A) is not particularly limited and can be general-purpose resins such as thermoplastic elastomer, polyolefin, polystyrene polyvinylchloride (PVC), polybiphenylchloride and polyvinyl alcohol, engineering plastics such as polycarbonate, polyamide, polyacetal, polyphenylene ether ultra-high molecular weight polyethylene, polysulfone, polyethersulfone, polyphenylenesulfide, polyalylate, polyamideimide, polyetherimide, polyetheretherketone, polyimide, polytetrafluoroethylene, liquid crystal polymer and fluororesin, or copolymers and mixtures thereof. For example, these base resins, to which a functional group is attached by graft or by introducing multiple functional groups, can be used as thermoplastic resin (B). Among these base resins, thermoplastic elastomer and polyolefin are preferable because the bubbles can be made finer.

Although the thermoplastic elastomer is not particularly limited and can be polystyrene elastomer, vinylchloride elastomer, polyolefin elastomer, polyester elastomer, polyamide elastomer, polyurethane elastomer, and the like, styrene elastomer is further preferable. Styrene elastomer can be elastomer containing styrene, such as SBS (styrene-butadiene-styrene copolymer), SEBS (styrene-ethylene/butylene-styrene copolymer), SIS (styrene-isoprene-styrene copolymer), SEP (styrene-ethylene/propylene copolymer), SEBC (styrene-ethylene/butylenes-ethylene block copolymer), and HSBR (hydrogenated styrene butadiene rubber). Among these, SEBS (styrene-ethylene/butylene-styrene copolymer) and SEBC (styrene-ethylene/butylenes-ethylene block copolymer) are more preferable.

In the present invention, if the specific gravity increases, or in other words, the foam growth decreases, this leads to a reduction in reflectance and formability due to reduction in the air bubble ratio and a decrease in weight-reduction effects, as a result, and thus, the specific gravity of the obtained thermoplastic resin foam is 0.7 or less. More preferably, the specific gravity is 0.65 or less, and further preferable is 0.5 or less. The specific gravity of the light reflector plate is preferable 0.05 or more.

In the present invention, although the amount of thermoplastic resin (B), which has a functional group, added to 100 parts by weight of thermoplastic resin (A) is not particularly limited, if the thermoplastic resin having a functional group is a polystyrene elastomer having a functional group, the amount is preferably 0.1 to 10 parts by weight. More preferably, it is 0.5 to 5 parts by weight, and further preferable is 0.5 to 3 parts by weight. If the amount of polystyrene elastomer, which has a functional group, added is less than 0.1 parts by weight, the air bubble diameters of the obtained foam tend to be large and dispersion tends to be uneven. On the other hand, if the amount of polystyrene elastomer, which has a functional group, added exceeds 10 parts by weight, it is disadvantageous from a cost perspective.

In the present invention, various additives, such as crystal nucleating agents, crystal promoting agents, bubble nucleating agents, antioxidants, antistatic agents, ultraviolet inhibitors, light stabilizers, fluorescent whitening agents, pigments, dyes, compatibilizing agents, lubricants, reinforcements, flame retardants, cross-linking agents, cross-linking aiding agents, plasticizers, thickening agents, and thinning agents, can be added to the thermoplastic resin before foaming, within a range which does not affect the characteristics thereof. In addition, resin containing the foregoing additives can be laminated onto the obtained thermoplastic resin foam or a coating containing these additives may be applied thereto. It is particularly preferable to apply a layer containing ultraviolet inhibitors or the like to at least one surface of the thermoplastic resin foam because sufficient ultraviolet-resisting degradation-inhibiting abilities can be given, even when materials which are prone to ultraviolet degradation are used in thermoplastic resin (A) and thermoplastic resin (B).

Although the method for manufacturing the thermoplastic resin foam of the present invention is not particularly limited, taking into consideration mass productivity, the implementation of a method such as the following is preferable. In other words, a method is implemented, wherein a resin sheet composed of thermoplastic resin (A) and thermoplastic resin (B), which has a functional group having an affinity with thermoplastic resin (A), is created, a roll is formed by layering and rolling the resin sheet and a separator, this roll is held in a pressurized inert gas atmosphere to enable the resin sheet to contain inert gas, and furthermore, the resin sheet containing inert gas is heated at a temperature higher than the softening temperature of thermoplastic resin (A), under normal pressure.

Helium, nitrogen, carbon-dioxide, argon and the like are given as inert gas. The amount of time for inert gas saturation and the amount of inert gas saturated until the resin sheet is in a saturated-state differs with the type of foamed resin, the type of inert gas, the saturation pressure and the thickness of the sheet. Carbon-dioxide is preferable, taking into consideration gas permeability (speed and solubility) to the resin.

In this method, the roll composed of the resin sheet and the separator can be made to contain organic solvent before being held in the pressurized inert gas atmosphere to enable the resin sheet to contain inert gas.

Benzene, toluene, methyl ethyl ketone, formic ether, acetone, acetic acid, dioxane, m-cresol, aniline, acrylonitrile, dimethyl phthalate, nitroethane, benzyl alcohol and the like are given as organic solvents. Among these, acetone is more preferable from the perspective of manageability and economic efficiency.

In the present invention, thermoplastic resin (B) is finely dispersed evenly throughout thermoplastic resin (A) because thermoplastic resin (B) has a functional group which mutually interacts in some way with thermoplastic resin (A). Although, if the thermoplastic resin (A) is polyester resin, in particular, the polyester resin crystallizes, induced by the inert gas, during gas permeation, there are effects such as the finely dispersed thermoplastic resin (B) becoming the starting points of crystal nucleation to form fine crystals, the starting points for bubble nucleation during foaming, or thermoplastic resin (B) forming fine foam. Therefore, when this resin sheet is foamed, there are fine pores with a mean bubble diameter of 10 μm or less formed evenly within, and a foam having high reflectance can be obtained. It is thought that fine pores are created with regards to other resin by the same mechanism.

EXAMPLES

Embodiments of the present invention are explained hereafter. The measurements and evaluation of various characteristics of the obtained thermoplastic resin foam are as follows.

(Specific Gravity)

The specific gravity (pf) of the foamed sheet was measured by the underwater replacement method.

(Foam Growth)

The foam growth was calculated by the ratio ps/pf of the specific gravity (pf) of the foamed sheet and the specific gravity (ps) of the resin prior to foaming. However, ps was calculated as 1.34.

(Mean Bubble Diameter)

The mean bubble diameter was determined according to ASTM D3376-77. In other words, an SEM photograph of the cross-section of the sheet is taken, a line is drawn in the horizontal direction and the vertical direction on the SEM photograph, and the length t of the string of the bubble intersected by the lines are averaged out. The mean bubble diameter d was determined with the magnification of the photograph substituted in the following equation as M.

$$D=t/(0.616 \times M)$$

(Reflectance)

The reflectance at a wavelength of 550 nm was measured using a spectral photometer (UV-3101PC, manufactured by Shimadzu Corporation). In table 1, the diffused reflectance of respective thermoplastic resin foams are indicated by increments, with the diffused reflectance of a whiteboard composed of packed micronized barium sulfate 100%.

(Shape-Retention)

The obtained thermoplastic resin foam was processed by heat-forming into a hemispheric light reflector plate having an opening part with a diameter of 100 mm and a depth of 70 mm, as shown in FIG. 1, by a vacuum forming machine. The existence of deformation was observed by holding the obtained light reflector plate manually and applying force thereto, and shape-retention was evaluated.

(Ultraviolet-Resisting Degradation-Inhibiting Abilities)

After the obtained thermoplastic resin foam was set in an ultraviolet degradation promoting device (Isuper UV tester SUV-W151, manufactured by Iwasaki Electric Co., Ltd.) and irradiated for 15 consecutive hours from an irradiation distance of 240 mm, under a temperature of 63° C. and 50% humidity, the color difference ΔE*ab was calculated based on JIS Z8730.

Example 1

After adding and kneading 1 part by weight of SEBS (Dynaron 8630P, manufactured by JSR), having a functional group into polyethylene terephthalate (grade: SA-1206, manufactured by Unitika, Ltd., ps=1.34), a sheet with a thickness of 0.5 mm, width of 300 mm, and a length of 60 mm was formed, this sheet and an olefin non-woven fabric separator (grade: FT300, manufactured by Japan Vilene Co., Ltd.) with a thickness of 160 μm, a width of 290 mm, a length of 60 mm, and a weight of 55 g/m2 were layered and rolled into a rolled-shape such that there are no sections wherein the su ace of the resin sheet come into contact with each other.

Subsequently, this roll is placed in a pressure container, the container is pressurized to 6 MPa by carbon-dioxide, and the resin sheet is saturated permeated with carbon-dioxide. The permeation time of the carbon-dioxide to the resin sheet was 72 hours. Next, the roll was removed from the pressure container and only the resin sheet was provided continuously to a hot-air circulation foaming furnace, set to 220° C., such that the foaming time is one minute, while removing the separator.

The obtained foam was foamed evenly and was extremely fine, with a mean bubble diameter of 1.5 μm. The thickness of the foam became 0.8 mm, and the reflectance of the foamed sheet indicated an extremely high value, 99.7%. In addition, upon evaluation of the ultraviolet-resisting degradation-inhibiting abilities after applying coating containing ultraviolet inhibitors to the surface, these abilities were an extremely superior 0.7.

Example 2

Aside from forming a sheet with a thickness of 0.5 mm, width of 300 mm, and a length of 60 mm after adding and kneading 1 part by weight of SEBC (Dynaron 4630P, manufactured by JSR), having a functional group, into polyethylene terephthalate (grade: SA-1206, manufactured by Unitika, Ltd., ps=1.34), the conditions were the same as that for Embodiment 1. The obtained foam was foamed evenly and was extremely fine, with a mean bubble diameter of 2.1 μm. The thickness of the foam became 0.8 mm, and the reflectance of the foamed sheet indicated an extremely high value, 99.2%.

Example 3

Aside from adding 3 parts by weight of SEBS (Dynaron 8630P, manufactured by JSR), having a functional group, the conditions were the same as that for Embodiment 1. The obtained foam was foamed evenly and was extremely fine, with a mean bubble diameter of 1.3 μm. The thickness of the foam became 0.8 mm, and the reflectance of the foamed sheet indicated an extremely high value, 99.5%.

Example 4

Aside from adding 5 parts by weight of SEBS (Dynaron 8630P, manufactured by JSR), having a functional group, the conditions were the same as that for Embodiment 1. The obtained foam was foamed evenly and was extremely fine, with a mean bubble diameter of 2.5 μm. The thickness of the foam became 0.8 mm, and the reflectance of the foamed sheet indicated an extremely high value, 99.1%.

Example 5

Aside from forming a sheet with a thickness of 0.5 mm, width of 300 mm, and a length of 60 mm after adding and kneading 0.5 part by weight of SEBC (Dynaron 8630P, manufactured by JSR), having a functional group, into polyethylene terephthalate (grade: SA-1206, manufactured by Unitika, Ltd., ρs=1.34), the conditions were the same as that for Embodiment 1. The obtained foam was foamed evenly and was extremely fine, with a mean bubble diameter of 2.6 μm. The thickness of the foam became 0.8 mm, and the reflectance of the foamed sheet indicated an extremely high value, 99.0%.

Example 6

Aside from forming a sheet with a thickness of 0.5 mm, width of 300 mm, and a length of 60 mm after adding and kneading 4 parts by weight of polyethylene (Bondfast E, manufactured by Sumitomo Chemical Co. Ltd.), having a functional group, into polyethylene terephthalate (grade: SA-1206, manufactured by Unitika, Ltd., ρs=1.34), the conditions were the same as that for Embodiment 1. The obtained foam was foamed evenly and was extremely fine, with a mean bubble diameter of 1.0 μm. The thickness of the foam became 0.8 mm, and the reflectance of the foamed sheet indicated an extremely high value, 99.0%.

Example 7

Aside from forming a sheet with a thickness of 0.5 mm, width of 300 mm, and a length of 60 mm after adding and kneading 1.0 part by weight of SEBS (Dynaron 8630P, manufactured by JSR), having a functional group, into polycarbonate (grade, L-1250, manufactured by Teijin, Ltd., ρs=1.20) to which thermoplastic elastomer was added, the conditions were the same as that for Embodiment 1. The obtained foam was foamed evenly and was extremely fine, with a mean bubble diameter of 4.0 μm. The thickness of the foam became 0.8 mm, and the reflectance of the foamed sheet indicated an extremely high value, 98.0%.

Comparative Example 1

Aside from forming a sheet with a thickness of 0.5 mm, width of 300 mm, and a length of 60 mm, using polyethylene terephthalate (grade: SA-1206, manufactured by Unitika, Ltd.; ρs=1.34) in which additives were not used, the conditions were the same as that for Embodiment 1. Although the obtained foam had favorable shape-retention properties, the bubbles were not even, the mean bubble diameter was 20 μm, and therefore, the reflectance was 80.1%.

Comparative Example 2

Aside from forming a sheet with a thickness of 0.5 mm, width of 300 mm, and a length of 60 mm, using polyethylene terephthalate (grade: SA-1206, manufactured by Unitika, Ltd.; ρs=1.34) to which 1.0 part by weight of SEB (Dynaron 8600P, manufactured by JSR), not having a functional group, is added, the conditions were the same as that for Embodiment 1. Although the obtained foam had favorable shape-retention properties, the mean bubble diameter was 12 μm, and therefore, the reflectance was 89.5%.

TABLE 1

| | Amount of thermoplastic resin (B) (parts by weight) | Thickness of sheet after foaming (mm) | Mean bubble diameter (μm) | Specific density | Foam growth (times) | Reflectance (%) | Shape-retention | Ultraviolet-resisting degradation-inhibiting ability |
|---|---|---|---|---|---|---|---|---|
| Example 1 | 1 | 0.8 | 1.5 | 0.36 | 3.7 | 99.7 | good | good |
| Example 2 | 1 | 0.8 | 2.1 | 0.43 | 3.1 | 99.2 | good | good |
| Example 3 | 3 | 0.8 | 1.3 | 0.41 | 3.3 | 99.5 | good | good |
| Example 4 | 5 | 0.8 | 2.5 | 0.28 | 4.8 | 99.1 | good | good |
| Example 5 | 0.5 | 0.8 | 2.6 | 0.36 | 3.7 | 99.0 | good | good |
| Example 6 | 4 | 0.8 | 1.0 | 0.35 | 3.8 | 99.0 | good | good |
| Example 7 | 1 | 0.8 | 4.0 | 0.33 | 3.6 | 98.0 | good | good |
| Comparative example 1 | 0 | 0.8 | 20 | 0.26 | 5.0 | 80.1 | good | good |
| Comparative example 2 | 0 | 0.8 | 12 | 0.37 | 3.6 | 89.5 | good | good |

The invention claimed is:

1. A thermoplastic resin foam which is a resin sheet composed of a polyester and a polyester elastomer, wherein
said polyester elastomer comprises a functional group having a mutual interaction with said polyester, which functional group is selected from the group consisting of an amino group, a glycidyl group, a hydroxyl group, an aldehyde group, a sulfo group, a nitro group, a halogen group, an oxazoline group, an isocyanate group, and a thiol group, and
said thermoplastic resin foam includes a plurality of pores with a mean bubble diameter of 10 μm or less therewithin, and has an expansion ratio of 3.1 to 4.8.

2. The thermoplastic resin foam according to claim 1, wherein said polyester elastomer is a thermoplastic elastomer having said functional group.

3. The thermoplastic resin foam according to claim 1, wherein said polyester is a polyester resin.

4. The thermoplastic resin foam according to claim 1, wherein a specific gravity of the thermoplastic resin foam is 0.7 or less.

5. The thermoplastic resin foam according to claim 1, wherein 0.1 to 10 parts by weight of polyester elastomer is added to 100 parts by weight of said polyester.

6. The thermoplastic resin foam according to claim 1, further comprising:
a layer including an ultraviolet inhibitor added to at least one surface of the thermoplastic resin foam.

7. The thermoplastic resin foam according to claim 1, wherein a specific gravity of the thermoplastic resin foam is 0.5 or less.

8. The thermoplastic resin foam according to claim 1, wherein the thermoplastic resin foam is manufactured by a method comprising:
holding a resin sheet including said polyester and said polyester elastomer, which has a functional group having an affinity with said polyester, within a pressurized inert gas atmosphere to enable the resin sheet to contain inert gas; and
foaming by heating the resin sheet containing said inert gas under normal pressure.

9. A method for manufacturing the thermoplastic resin foam of claim 1, comprising:
holding a resin sheet including said polyester and said polyester elastomer within a pressurized inert gas atmosphere to enable the resin sheet to contain inert gas, and
foaming by heating the resin sheet containing said inert gas under normal pressure.

10. The method for manufacturing a thermoplastic resin foam according to claim 9, wherein said thermoplastic resin foam has an expansion ratio of 3.1 to 4.8.

11. The method for manufacturing the thermoplastic resin foam according to claim 9, wherein said polyester elastomer is a thermoplastic elastomer having said functional group.

12. The method for manufacturing a thermoplastic resin foam according to claim 9, wherein said polyester is a polyester resin.

13. The method for manufacturing a thermoplastic resin foam according to claim 9, wherein a specific gravity of said thermoplastic resin foam is 0.7 or less.

14. The method for manufacturing a thermoplastic resin foam according to claim 9, wherein 0.1 to 10 parts by weight of said polyester elastomer is added to 100 parts by weight of said thermoplastic resin (A).

15. The method for manufacturing the thermoplastic resin foam according to claim 10, wherein said polyester elastomer is a thermoplastic elastomer having said functional group.

16. The method for manufacturing a thermoplastic resin foam according to claim 9, wherein a specific gravity of the thermoplastic resin foam is 0.5 or less.

17. The method for manufacturing a thermoplastic resin foam according to claim 9, further comprising:
applying a layer containing ultraviolet inhibitors to at least one surface of the thermoplastic resin foam.

* * * * *